(No Model.) 2 Sheets—Sheet 1.
H. SCHULZE-BERGE.
SCREW PROPELLER.
No. 317,582. Patented May 12, 1885.
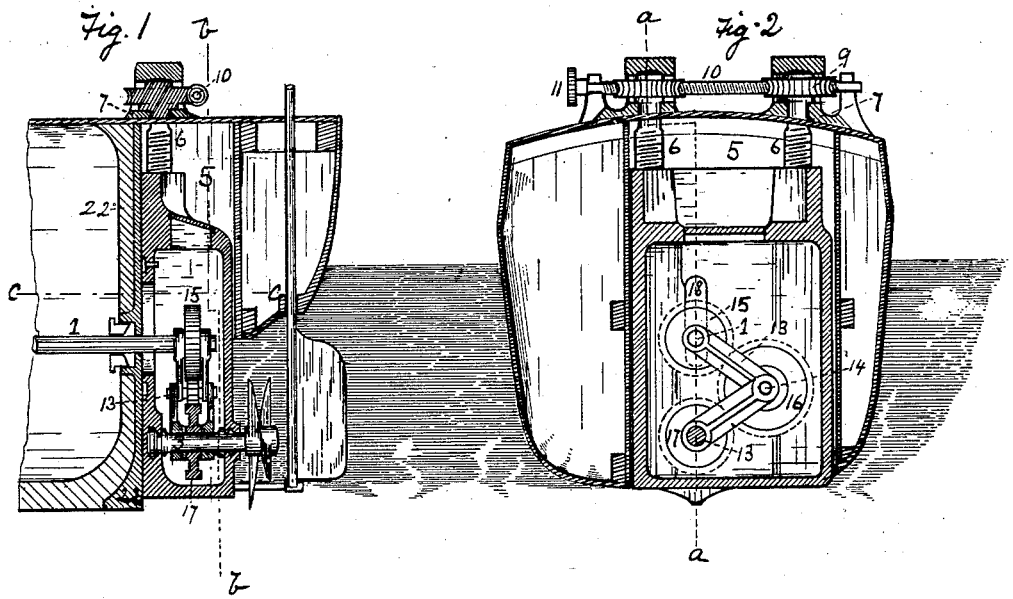
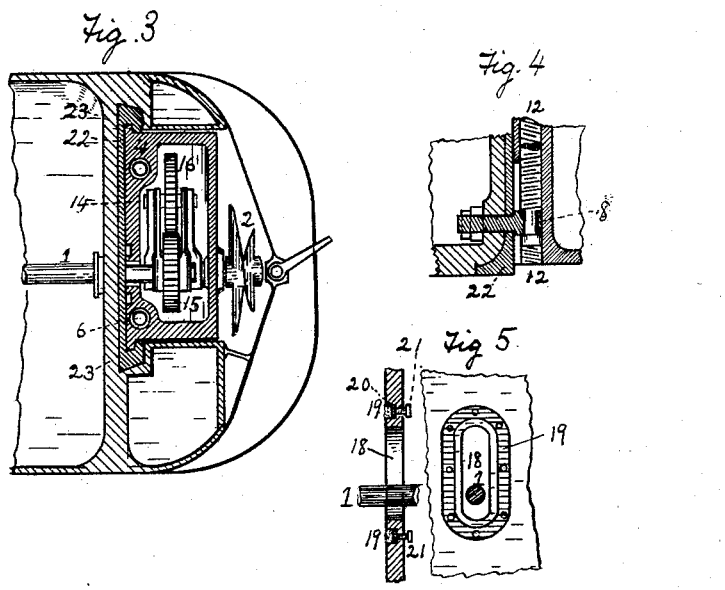
WITNESSES:
J. A. Burns.
J. K. Smith
INVENTOR
Hermann Schulze Berge
BY
Bakewell & Kerr
ATTORNEYS (No Model.) 2 Sheets—Sheet 2.
H. SCHULZE-BERGE.
SCREW PROPELLER.
No. 317,582. Patented May 12, 1885.
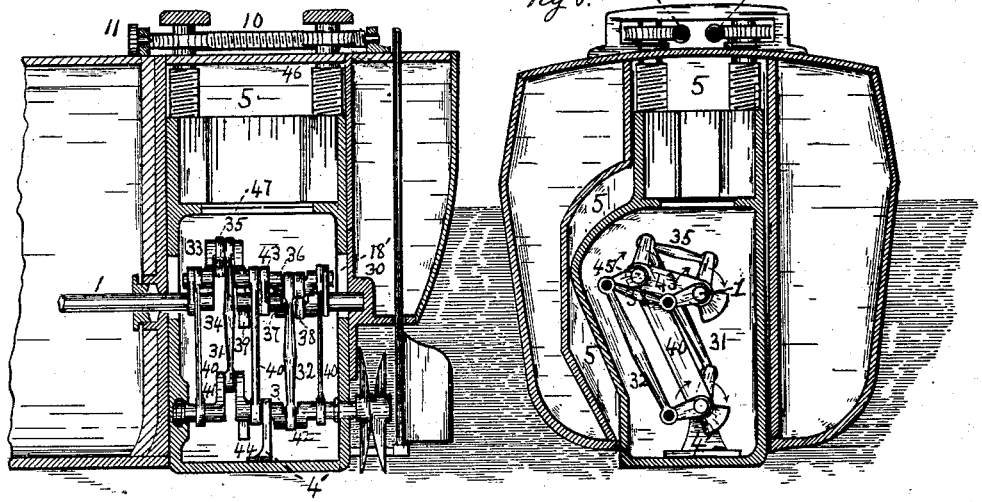
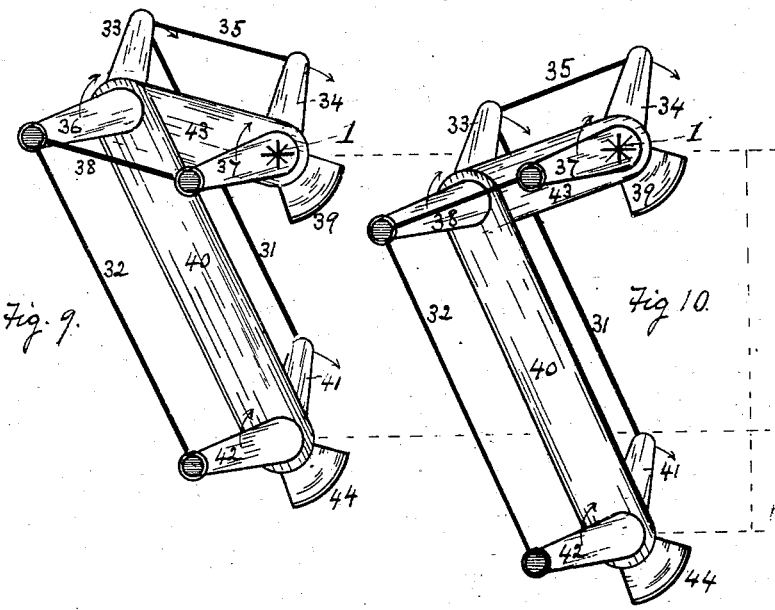
WITNESSES:
J. A. Burns
J. K. Smith
INVENTOR
Hermann Schulze-Berge
BY
Bakewell & Kerr
ATTORNEYS

UNITED STATES PATENT OFFICE.

HERMANN SCHULZE-BERGE, OF ROCHESTER, PENNSYLVANIA.

SCREW-PROPELLER.

SPECIFICATION forming part of Letters Patent No. 317,582, dated May 12, 1885.

Application filed June 12, 1884. (No model.)

*To all whom it may concern:*

Be it known that I, HERMANN SCHULZE-BERGE, of Rochester, in the county of Beaver and State of Pennsylvania, have invented a new and useful Improvement in Screw-Propellers; and I do hereby declare the following to be a full, clear, and exact description thereof.

The usual manner of mounting screw-propeller shafts in fixed or stationary bearings is open to serious disadvantages. The screw works best when the vessel is loaded, because then it is deeply submerged; but when the vessel is lightened the screw is nearer the surface and throws the water into the air and produces a higher swell, thereby causing less efficient action and a serious loss of power. In rough weather the screw is often out of the water by reason of the pitching of the vessel, and, losing its resistance of the water, obtains a greatly accelerated speed, which is attended with sudden and violent strains on the machinery, often causing breakages of a serious nature, and sometimes such as retard the voyage of the vessel and endanger its safety. It is also attended with a thumping or pounding of the engine, producing a jar or vibration of the vessel, which is exceedingly disagreeable and annoying to the passengers, especially if they are suffering from seasickness. This effect is so bad at the after part of the vessel that the berths and cabins near the screw are usually less in demand and considerably cheaper than those farther forward. Another disadvantage is that while on a voyage no access can be had to the screw through the stern for repairs or renewal in case of the breaking or loss of the screw, so that it is very difficult and dangerous to make such repairs or renewals, and causes considerable trouble and delay.

My invention is designed to obviate these difficulties; and it consists in providing a vessel with a vertically-adjustable propeller which can be submerged to the required depth, whatever may be the water-line of the vessel.

To enable others skilled in the art to make and use my invention, I will now describe it by reference to the accompanying drawings, which form part of this specification.

Figure 1 is a vertical longitudinal section of the stern of a vessel on the line *a a* of Fig. 2. Fig. 2 is a vertical section on the line *b b* of Fig. 1. Fig. 3 is a horizontal section on the line *c c* of Fig. 1. Figs. 4, 5, and 6 are details. Figs. 7, 8, 9, and 10 show another modification.

The driving-shaft 1 is mounted in stationary bearings, and receives its revolving motion from the engine in the usual way. Instead of the screw 2 being attached to this shaft, it is mounted on an independent shaft, 3, which is journaled in a cage or carrier, 4, placed in a well, 5, in the stern. The carrier 4 is sustained by means of the screws 6, by which it may be raised or lowered to any desired position in the well. The upper ends of the screws 6 are sustained in bearings 7 and the lower ends in bearings 8, secured to the timbers of the vessel. (See Fig. 4.) On the upper ends of the screws 6 are worm-wheels 9, which gear into a horizontal screw-shaft, 10, provided with a pinion, 11, squared hub, or other provision for turning it to effect the adjustment of the carrier 4. The carrier is provided with hollow internally-threaded sleeves, shafts, or nuts 12, Figs. 3 and 4, through which the screws 6 extend to cause it to rise or fall in the well, as the case may be, when the screws are turned in their stationary bearings 7 and 8. Mounted on the shafts 1 and 3 are swinging links or bearings 13, the other ends of which encircle or are pivoted on a shaft or journal, 14. Keyed to the end of the driving-shaft 1 is a pinion, 15. On the shaft 14 is an idler or pinion, 16, which gears into the pinion 15, and keyed to the propeller-shaft 3 is a pinion, 17, which gears into the pinion 16. This construction permits the propeller-shaft 3 to be moved toward and away from the stationary journaled driving-shaft 1 without disconnecting or ungearing the pinions 15, 16, and 17, as illustrated in Fig. 6. The inner side of the carrier 4 is provided with a vertical slot, 18, to permit its vertical movement past the shaft, and this slot is surrounded on the outside by a groove, in which a suitable packing, 19, is placed to prevent the water from entering the carrier through the slot. Back of the ring of packing 19 is a metallic plate, 20, against which the ends of the set-screws 21 bear for the purpose of setting out the packing against the face of the metal plate 22, which forms the inner side of the well 5. The inner corners of the carrier are provided with tongues 23, which slide in vertical grooves formed in the edges of the plate 22, Fig. 3.

In the modification shown in Figs. 7, 8, 9, and 10 I substitute cranks between the main driving-shaft 1 and the propeller-shaft 3. The end of the main driving-shaft 1 is extended across the well 5 through a second slot, 18', in the outer side of the carrier 4, and has a stationary bearing, 30, in the rear part of the vessel. Mounted loosely on the main shaft 1 are swinging arms or bearings 43, the outer ends of which support a counter-shaft, 45. The main shaft is provided with cranks 34 37, and the counter-shaft 45 is provided with cranks 33 36, said cranks being keyed to their respective shafts. The cranks 34 and 37 quarter with each other, which is also the case with the cranks 33 and 36, so as to carry the driven shafts over the dead-point, and the cranks 33 and 34 are connected together by means of a pitman, 35, which is mounted loosely on their respective wrists, and the cranks 36 and 37 are connected in like manner by a pitman, 38. The result of this construction is that the counter-shaft 45 is turned by power from the main shaft 1. The propeller-shaft 3 is provided with cranks 41 and 42, which are connected, respectively, to the cranks 33 and 36 and the counter-shaft 45 by means of pitmen 31 and 32, so that the motion which the shaft 45 receives from the main shaft 1 is transmitted to the propeller-shaft 3. The main shaft 1 and the propeller-shaft 3 are provided with radial balances 39 and 44, which are equally spaced with the crank-arms of said shafts, so as to make the shafts run smoothly. The counter-shaft 45 is also supported from the propeller-shaft 3 by swinging braces 40, which are mounted loosely on both shafts. The propeller-shaft 3 is supported by a foot, 4', in which it has a bearing. This construction enables the carrier 4 to be raised or lowered with reference to the main shaft 1 without interfering with the transmission of power from the main shaft to the propeller-shaft. The diagram, Fig. 9, shows the shafts in position occupied by them when the carrier is raised, and the diagram, Fig. 10, shows the position of the shafts and connections when the carrier is lowered for the purpose of submerging more deeply the screw.

In Figs. 9 and 10 the pitmen 31, 32, 35, and 38 are illustrated by means of single lines for greater clearness of illustration. This construction enables much greater power to be applied to the propeller-shaft than in the first construction, and obviates all danger arising from the stripping of the teeth in the gearing shown in such construction, and for these reasons is the form which I prefer.

In Figs. 7 and 8 the carrier 4 is shown to be operated by two screw-shafts instead of one, as in Figs. 1 and 2. I also show in Fig. 7 a removable section, 46, of the deck over the well 5 and the carrier 4, provided with a man-hole, 47, whereby access may be had to the interior of the screw or ship for the purpose of oiling the machinery and of repairs.

The advantages of my invention have been fully stated. The propeller can be submerged to any desired depth, and ample provision is made for gaining access thereto or to its connections from the deck of the ship without the danger and difficulty which have heretofore existed in the usual constructions.

What I claim as my invention, and desire to secure by Letters Patent, is—

1. In a ship provided with a screw-propeller, the combination of the main driving and propeller shafts with an intermediate shaft or journal mounted in bearings which swing around the main driving and propeller shaft, substantially as described.

2. A vessel provided with a main driving-shaft mounted in stationary bearings, in combination with a propeller-shaft capable of vertical adjustment, and an intermediate crank-shaft revoluble in swinging bearings which radiate from and are pivotally connected to the other shafts, and having its cranks connected by pitmen to corresponding cranks on the driving and propeller shafts, substantially as and for the purposes described.

In testimony whereof I have hereunto set my hand this 26th day of May, A. D. 1884.

HERMANN SCHULZE-BERGE.

Witnesses:
W. B. CORWIN,
THOMAS W. BAKEWELL.